Jan. 1, 1957 L. J. LYNCH 2,776,430

TELEVISION ANTENNA

Filed March 13, 1951

2 Sheets-Sheet 1

Inventor:
Leonard J. Lynch
Andrew F. Wintercorn
Atty.

Jan. 1, 1957 L. J. LYNCH 2,776,430

TELEVISION ANTENNA

Filed March 13, 1951 2 Sheets-Sheet 2

Inventor:
Leonard J. Lynch
Andrew F. Wintercorn
Atty.

United States Patent Office 2,776,430

Patented Jan. 1, 1957

2,776,430

TELEVISION ANTENNA

Leonard J. Lynch, De Kalb, Ill.

Application March 13, 1951, Serial No. 215,332

11 Claims. (Cl. 343—836)

This invention relates to a new and improved antenna. The greatest losses of signals occur in the higher frequencies, and it is the principal object of my invention to provide an antenna designed and constructed to handle these higher frequencies and yet perform as satisfactorily as other antennas on the lower frequencies.

The antenna of my invention utilizes a vertical array with a view to giving better frequency coverage than a folded dipole with reflector of yagie, and has reflectors located above and below the center element, with a view to allowing more reflected energy than the single conventional reflector placed behind the antenna, and, since the reflectors are connected with a transposed lead to the center element, the signal still aids to give the gain of a yagie and yet gives far better frequency coverage than a yagie equipped antenna.

The principal advantage in the operation of the present antenna is its ability to separate out the signals from one of two television stations operating on the same channel, so that the user can enjoy the program broadcast from the other station without interference. Most stations on the same channel are located only one hundred fifty to two hundred miles apart, so that their signals overlap in a considerable area inbetween. One example of this is the area located between WOC in Davenport, Iowa, and WNBQ in Chicago, Illinois. The interference between these two stations has been so bad that channel 5 was rendered useless to most set owners in the area between until one of those stations went off the air. The picture, due to interference, was completely distorted. The synchronizing signal from one station would prevent the other from locking the picture in the frame, and, as a result, the picture was never still unless the impulses were in phase, and even then each frame would have two pictures superimposed. The antenna of my invention overcomes the difficulty mentioned by being so designed that it has a front to back ratio of thirty to one on any desired frequency on the television band. Such a large front to back ratio is obtained by means of a tuned reflector used in conjunction with the antenna and tunable to any desired television channel. In the tuning of the reflector, relay circuits connected with the reflector are closed, to permit the antenna to receive the desired signals from one station without interference from another station, or stations, on the same frequency, the antenna being turned to face the station selected with the reflector behind it and facing the station whose interfering signals are to be rejected. Many combinations of circuits are made possible with the number of relays provided, and the one installing a set can designate to the user what combinations of switches to operate to avoid interference from the predominant source, or sources, of interference, other combinations, of course, being designated to avoid interference from certain other sources.

Referring to the accompanying drawings illustrating the invention—

Figures 5, 6, 7, 8:
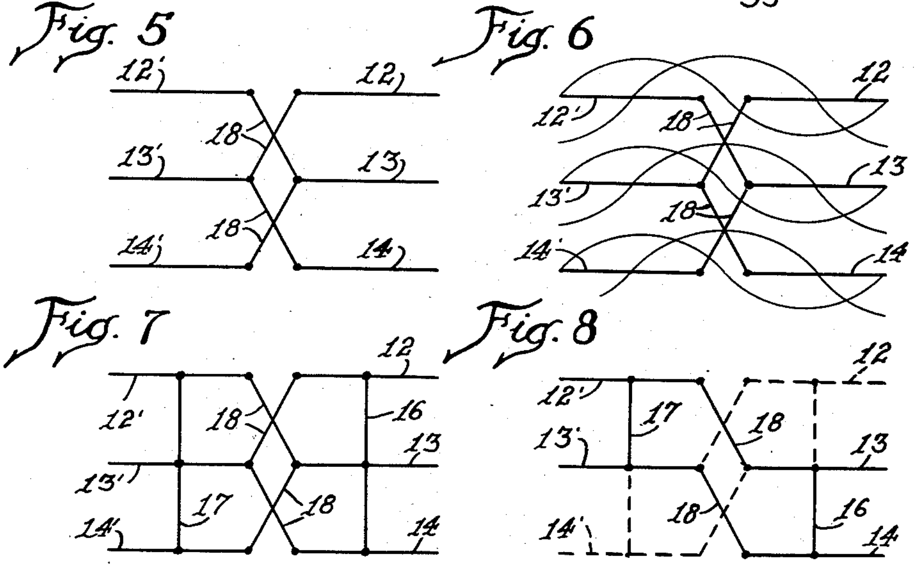
Fig. 5 is a diagram for the antenna of Fig. 1, which can be considered a high band array.
Fig. 6 is a diagram showing the voltage curves on a full wave antenna.
Figure 9:
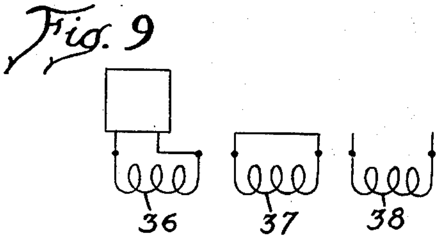

Fig. 7 is a diagram, similar to Fig. 5, for an antenna in which all of the points of zero voltage or potential, corresponding to what is shown in Fig. 6, are tied together with vertical elements to form an antenna resonant at channel 2 without disturbing the high band array illustrated in Fig. 8, the vertical members having formed four loops to receive the low band, and Fig. 9 is a diagram serving to explain the theory of the tuned reflector.

The same reference numerals are applied to corresponding parts throughout the views.

Figures 1, 2, 3:
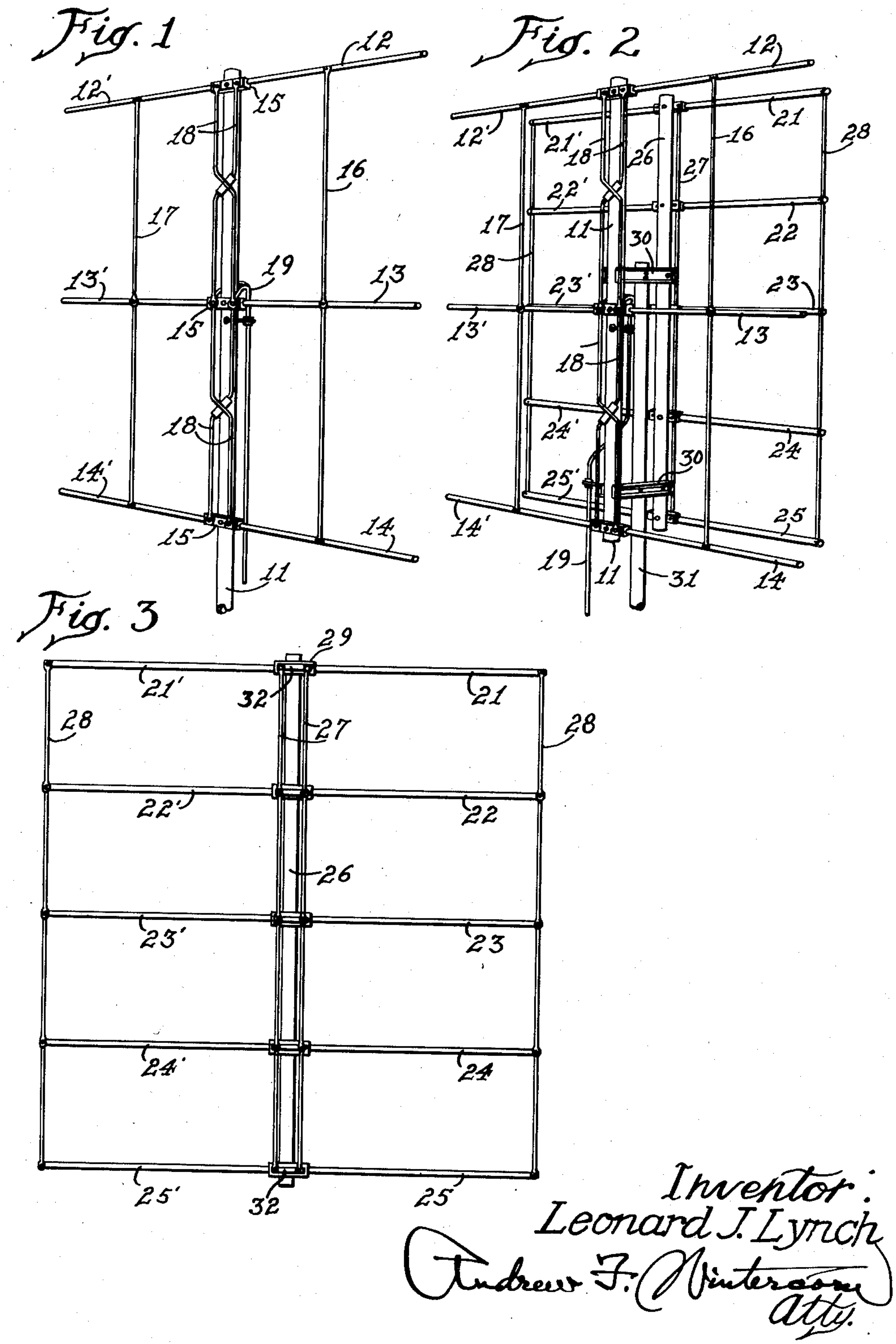
Fig. 1 is a perspective view of the antenna minus the reflector.
Fig. 2 is a perspective view of the antenna with the reflector in assembled relation thereto; the reflector being a part purchasable separately for application to existing antennas.
Fig. 3 is a face view of the reflector.

Referring first to Figs. 1 and 7, the antenna comprises a vertical supporting mast 11, having two sets of horizontally disposed, vertically spaced, parallel, metal rods 12, 13, and 14, and 12', 13' and 14' mounted in coplanar relationship but on opposite sides of the mast 11, as by means of insulators 15 to which the rods or elements are suitably secured in insulated relation to one another and to the mast. A vertical metal rod 16 connects the midpoints of rods 12, 13, and 14 in rigid relationship, and another vertical metal rod 17 connects the midpoints of rods 12', 13', and 14' in rigid relationship. The inner ends of the middle rods 13 and 13' are cross-connected with the upper and lower rods 12 and 14 and 12' and 14' by conductors 18 to complete the antenna, and there is a conducting line 19 connected therewith and extending to the set. The antenna as thus far described has the general appearance of a fly swatter and is often so named.

In Fig. 6 there are indicated the voltage curves as they are on a full wave antenna, and it will be noted that the null points, where there is zero voltage, where the curves cross the rods, are at the midpoints of these rods, and, therefore, since these points are of zero voltage or potential, they can be tied together with the vertical rods 16 and 17. The vertical rods then have completed an antenna resonant at channel 2 without disturbing the high band array illustrated in Fig. 8, the vertical rods, in other words, having formed with the other rods four loops to receive the low band. So much for the antenna itself.

Figure 4:
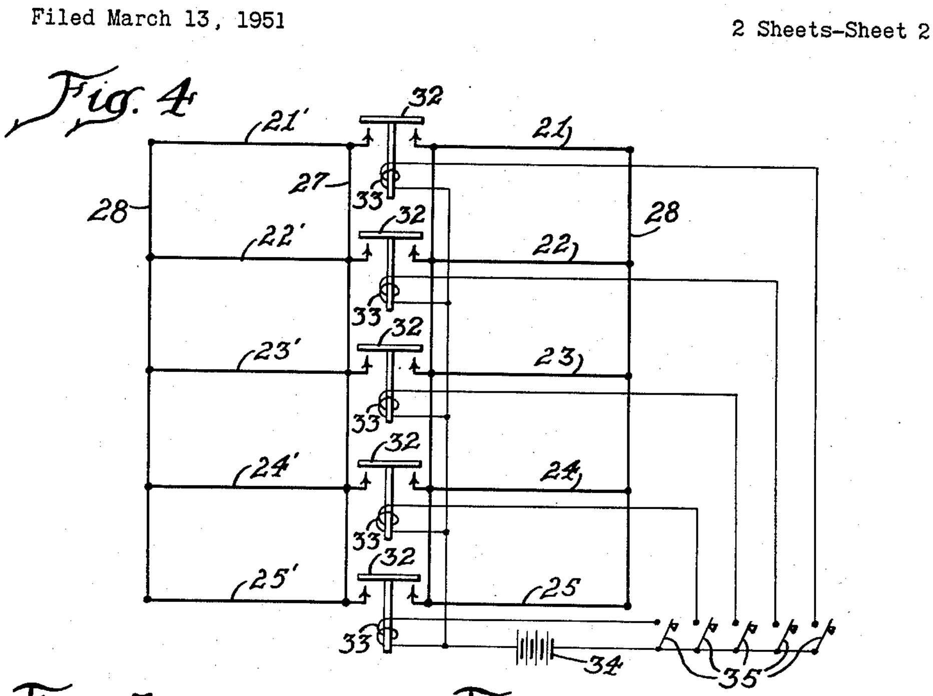
Fig. 4 is a wiring diagram for the tuned reflector, showing relay controlled shorting bars.

Referring next to Figs. 3 and 4, the reflector consists of two sets of horizontal, parallel, metal rods 21—25 and 21'—25' disposed in vertically spaced coplanar relationship on opposite sides of a supporting mast 26, the rods of each set being rigidly electrically connected by vertical rods 27 and 28 at their inner and outer ends, respectively, and supported on the mast 26 by insulators 29 in insulated relation to one another and to the mast. The vertical array of rods 21, 23, and 25 and 21', 23', and 25' in the reflector is similar to the vertical array of rods 12—14 and 12'—14' on the antenna, the rods 22 and 24 and 22' and 24' in the reflector being midway between rods 21, 23, and 25, and 21', 23', and 25', respectively. The reflector is mounted behind the antenna, as shown in Fig. 2, in a fixed, spaced, parallel relationship, the masts 11 and 26 being cut off just below the antenna and reflector and clamped together, as shown at 30, and to a main mast 31, which is, of course, arranged to be turned in the usual way, so that the antenna portion faces the selected station and the reflector portion shields the antenna portion against interference from another station on the same channel. Four loops are formed on each side of the mast 26 by the interconnected rods, and shorting bars 32, which are disposed between the ends of the rods 21—25 and 21′—25′ and normally in spaced relationship thereto, are the armature parts of the relays, the coils 33 of which, as shown in Fig. 4, all have one end thereof connected to a battery 34, the other ends being connected with selector switches 35, all of which are, in turn, connected with the other side of the battery 34, so that any combination of loops may be used in the tuning of the reflector to provide good reception of programs in any of the twelve channels. Some of the channels require actuation of as many as four of the shorting bars 32 at a time, that being true, for example, for channel 5 in the vicinity of De Kalb, Illinois, where, as previously stated, interference between WOC Davenport and WNBQ Chicago has been so bad that channel 5 was practically useless to set owners in that area so long as both stations were broadcasting. Others, like channel 9, for example, require the operation of only two of the shorting bars 32 across the reflector rods 23—23′ and 25—25′ in that same area. The reflector is placed as close as possible to the antenna to prevent as much interference as possible from the side and yet allow maximum gain on the high band, which includes channels 7 through 13, where most losses occur.

To enable a better understanding of the theory used in the design of the reflector, attention is called to Fig. 9 in which is illustrated a very simple experiment. A signal generator is connected across a coil 36. The second coil 37 has several taps to enable shorting out sections of the coil to bring its resonance to equal that of the signal generator. If coil 36 is considered the transmitter, coil 37 the reflector, and coil 38 the antenna, coil 38 will receive a minimum amount of energy, assuming coil 37 has been tuned properly to act as a wave trap and absorb most of the energy radiated from coil 36. Consequently, the receiving part of the antenna 38 will receive only a small percentage of the transmitted energy from coil 36, coil 37 being tuned to resonance so as to absorb most of the energy from coil 36. Now, an antenna that is to meet the needs of all areas requires a reflector capable of tuning to any of the twelve channels. With the five shorting bars 32 cooperating with the ten rods 21—25 and 21′—25′, a set of eight shorted loops are made available, part of each loop being usable as part of another, depending upon which of the bars 32 are operated. In that way two variable inductances are connected in parallel, and, as a result, the reflector can be tuned to the desired frequency.

In conclusion, it was noted in laboratory tests made with the present antenna and reflector combination that the field strength measurements showed 25% more signal on the low band and 35% more on the high band as compared to the unaided antenna, all due to the reflector action. The field strength pattern was checked to show the front to back ratio by starting with the antenna pointing at the station selected and then rotating it through 360°. It was found that at 160° the front to back ratio is at a minimum of fifteen to one, but at 180°, when the reflector is broadside to the station, a decided dip occurs and the ratio rises to thirty to one. Consequently, if the station causing interference is nearly 180° from the desired station, the best results are obtained with the antenna facing the desired station with the reflector behind it, although good results are obtainable even where that preferred relationship is not possible. In some cases the strength of the forward signal can be sacrificed to some extent to lessen the interference. The one installing a set will make tests and designate what combinations of switches 35 to operate to avoid interference from the predominant source of interference in a given locality, other combinations, of course, being designated to avoid interference from other sources.

It is believed the foregoing description conveys a good understanding of the objects and advantages of my invention. The appended claims have been drawn to cover all legitimate modifications and adaptations.

I claim:

1. A television antenna reflector adapted for use in parallel spaced relationship to a vertical array antenna, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, substantially vertical metallic rod elements in substantially parallel spaced relation on each side of the mast rigidly and electrically interconnecting the end portions of the horizontal rod elements so as to define a plurality of loops on each side of the mast, and means selectively electrically connecting one or more loops on opposite sides of the mast, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast.

2. A television antenna reflector adapted for use in parallel spaced relationship to a vertical array antenna, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops in each side of the mast, and means electrically connecting loops on opposite sides of the mast, there being five pairs of said horizontal rod elements in evenly vertically spaced parallel relation, and an antenna in combination with said reflector comprising an upright supporting mast, three pairs of substantially horizontal metallic rod elements carried by said mast in insulated relation thereto and to one another extending from opposite sides thereof in aligned relationship, the pairs being in equally vertically spaced, substantially coplanar relation, and a substantially vertical metallic rod element on each side of the mast rigidly electrically interconnecting the horizontal rod elements at their mid-points, each pair of horizontal rod elements being electrically cross-connected with the next pair of horizontal rod elements therebeneath, the first, third, and fifth pairs of rod elements of said reflector counting from the top or bottom of the reflector being spaced to correspond with the spacing of rod elements in vertical array on the associated antenna, and the second and fourth pairs of rod elements of said reflector being midway between the first and third and third and fifth pairs, respectively.

3. A television antenna reflector adapted for use in parallel spaced relationship to a vertical array antenna, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops in each side of the mast, and means electrically connecting loops on opposite sides of the mast, the last mentioned means comprising shorting bars between the adjoining ends of certain pairs of horizontal rod elements, electrical relay means for actuating said bars to shorting position, and selector switches electrically connected with said relay means and a source of electric current supply.

4. A television antenna reflector adapted for use in parallel spaced relationship to a vertical array antenna, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops in each side of the mast, and means electrically connecting loops on opposite sides of the mast, the last mentioned means comprising shorting bars between the adjoining ends of certain pairs of horizontal rod elements, electrical relay means for actuating said bars to shorting position, and selector switches electrically connected with said relay means and a source of electric current supply, there being five pairs of said horizontal rod elements in evenly vertically spaced parallel relation, and five shorting bars associated with the five pairs and five selector switches controlling the operation of five relays associated with the five shorting bars.

5. A television antenna and reflector combination comprising an antenna consisting of an upright supporting mast, pairs of substantially horizontal metallic rod elements carried by said mast in insulated relation thereto and to one another extending from opposite sides thereof in aligned relationship, the pairs being in vertically spaced substantially coplanar relation, and a substantially vertical metallic rod element on each side of the mast rigidly and electrically interconnecting the horizontal rod elements at their mid-points, each pair of horizontal rod elements being electrically cross-connected with the next pair of horizontal rod elements therebeneath, said antenna being mounted in a fixed, spaced, substantially parallel relation to a reflector, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast, said last mentioned means being constructed and arranged to electrically connect a selected one or more loops on one side of the mast with a selected one or more loops on the other side.

6. A television antenna and reflector combination comprising an antenna consisting of an upright supporting mast, pairs of substantially horizontal metallic rod elements carried by said mast in insulated relation thereto and to one another extending from opposite sides thereof in aligned relationship, the pairs being in vertically spaced substantially coplanar relation, and a substantially vertical metallic rod element on each side of the mast rigidly and electrically interconnecting the horizontal rod elements at their mid-points, each pair of horizontal rod elements being electrically cross-connected with the next pair of horizontal rod elements therebeneath, said antenna having three pairs of horizontal rod elements in evenly vertically spaced relation and being mounted in a fixed, spaced, substantially parallel relation to a reflector, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast, said reflector having five pairs of horizontal rod elements in evenly vertically spaced parallel relation, the first, third and fifth pairs of the latter rod elements being spaced like the three pairs of rod elements of the antenna, and the second and fourth pairs of rod elements of the reflector being midway between the first and third and third and fifth pairs, respectively, the said means electrically connecting loops on opposite sides of the mast of said reflector being constructed and arranged to electrically connect a selected one or more loops on one side of the mast with a selected one or more loops on the other side.

7. A television antenna and reflector combination comprising an antenna consisting of an upright supporting mast, pairs of substantially horizontal metallic rod elements carried by said mast in insulated relation thereto and to one another extending from opposite sides thereof in aligned relationship, the pairs being in vertically spaced substantially coplanar relation, and a substantially vertical metallic rod element on each side of the mast rigidly and electrically interconnecting the horizontal rod elements at their mid-points, each pair of horizontal rod elements being electrically cross-connected with the next pair of horizontal rod elements therebeneath, said antenna being mounted in a fixed, spaced, substantially parallel relation to a reflector, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast, said last mentioned means comprising shorting bars between the adjoining ends of certain pairs of horizontal rod elements, electrical relay means for actuating said bars to shorting position, and selector switches electrically connected with said relay means and a source of electric current supply.

8. A television antenna and reflector combination comprising an antenna consisting of an upright supporting mast, pairs of substantially horizontal metallic rod elements carried by said mast in insulated relation thereto and to one another extending from opposite sides thereof in aligned relationship, the pairs being in vertically spaced substantially coplanar relation, and a substantially vertical metallic rod element on each side of the mast rigidly and electrically interconnecting the horizontal rod elements at their mid-points, each pair of horizontal rod elements being electrically cross-connected with the next pair of horizontal rod elements therebeneath, said antenna having three pairs of horizontal rod elements in evenly vertically spaced relation and being mounted in a fixed, spaced, substantially parallel relation to a reflector, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast having five pairs of horizontal rod elements in evenly vertically spaced relation, the first, third and fifth pairs of the latter rod elements being spaced like the three pairs of rod elements of the antenna, and the second and fourth pairs of rod elements of the reflector being midway between the first and third and third and fifth pairs, respectively, the said means electrically connecting loops on opposite sides of the mast of said reflector comprising shorting bars between the adjoining ends of certain pairs of horizontal rod elements, electrical relay means for actuating said bars to shorting position, and selector switches electrically connected with said relay means and a source of electric current supply.

9. A television antenna and reflector combination comprising an antenna consisting of an upright supporting mast, pairs of substantially horizontal metallic rod elements carried by said mast in insulated relation thereto and to one another extending from opposite sides thereof in aligned relationship, the pairs being in vertically spaced substantially coplanar relation, and a substantially vertical metallic rod element on each side of the mast rigidly and electrically interconnecting the horizontal rod elements at their mid-points, each pair of horizontal rod elements being electrically cross-connected with the next pair of horizontal rod elements therebeneath, said antenna having three pairs of horizontal rod elements in evenly vertically spaced relation and being mounted in a fixed, spaced, substantially parallel relation to a reflector, said reflector comprising an upright supporting mast, pairs of substantially horizontal metallic rod elements carried by said mast in insulated relation thereto and to one another extending from opposite sides thereof in aligned relationship, the pairs being in vertically spaced substantially coplanar relation, a pair of substantially vertical metallic rod elements in substantially parallel spaced relation on each side of the mast rigidly and electrically interconnecting the end portions of the horizontal rod elements so as to define a plurality of loops on each side of the mast, and means electrically connecting loops on opposite sides of the mast having five pairs of horizontal rod elements in evenly vertically spaced relation, the first, third and fifth pairs of the latter rod elements being spaced like the three pairs of rod elements of the antenna, and the second and fourth pairs of rod elements of the reflector being midway between the first and third and third and fifth pairs, respectively, the said means electrically connecting loops on opposite sides of the mast of said reflector comprising shorting bars between the adjoining ends of certain pairs of horizontal rod elements, electrical relay means for actuating said bars to shorting position, and selector switches electrically connected with said relay means and a source of electric current supply, there being five shorting bars associated with the five pairs of rod elements on the reflector, and five selector switches controlling the operation of five relays associated with the five shorting bars.

10. In combination with a vertical array type television antenna, a vertical array type reflector in a fixed, spaced, substantially parallel relationship to the back thereof and including a plurality of loops which are connected to form an impedance which by absorption of otherwise interfering signals from an undesired station in a channel shields the television antenna while it is receiving signals from a desired station in that channel.

11. In combination with a vertical array type television antenna, a vertical array type reflector in a fixed, spaced, substantially parallel relationship to the back thereof and including a plurality of loops which are connected to form an impedance which by absorption of otherwise interfering signals from an undesired station in a channel shields the television antenna while it is receiving signals from a desired station in that channel, the two spaced vertical arrays being rotatable as a unit on a vertical axis, and said loops having means for selectively connecting the same in different combinations to give a different shielding action in different channels.

References Cited in the file of this patent

UNITED STATES PATENTS

| | | |
|---|---|---|
| 1,964,190 | Bohm et al. | June 26, 1934 |
| 2,055,100 | Gothe | Sept. 22, 1936 |
| 2,112,269 | Carter | Mar. 29, 1938 |
| 2,163,770 | Von Radinger | June 27, 1939 |
| 2,183,784 | Carter | Dec. 19, 1939 |
| 2,204,175 | Carter | June 11, 1940 |
| 2,267,889 | Aubert | Dec. 30, 1941 |
| 2,558,727 | Bernet | July 3, 1951 |
| 2,566,287 | Finneburgh | Aug. 28, 1951 |
| 2,577,469 | Kumpf | Dec. 4, 1951 |
| 2,591,297 | Rosenthal | Apr. 1, 1952 |
| 2,615,005 | White | Oct. 21, 1952 |

OTHER REFERENCES

Radio Amateur's Handbook, 26th Edition, 1949, pages 349 and 350.